(12) United States Patent
Davis et al.

(10) Patent No.: US 11,085,314 B2
(45) Date of Patent: Aug. 10, 2021

(54) SLIDING SEAL

(71) Applicant: UNITED TECHNOLOGIES CORPORATION, Farmington, CT (US)

(72) Inventors: Timothy M. Davis, Kennebunk, ME (US); Paul M. Lutjen, Kennebunkport, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 172 days.

(21) Appl. No.: 16/271,323

(22) Filed: Feb. 8, 2019

(65) Prior Publication Data

US 2019/0170007 A1 Jun. 6, 2019

Related U.S. Application Data

(62) Division of application No. 14/681,578, filed on Apr. 8, 2015, now Pat. No. 10,202,862.

(51) Int. Cl.
| | |
|---|---|
| *F01D 11/00* | (2006.01) |
| *F16J 15/08* | (2006.01) |
| *F16J 15/10* | (2006.01) |
| *F01D 25/24* | (2006.01) |

(52) U.S. Cl.
CPC .......... *F01D 11/005* (2013.01); *F01D 25/246* (2013.01); *F16J 15/0887* (2013.01); *F16J 15/104* (2013.01); *F05D 2240/55* (2013.01); *F05D 2240/81* (2013.01); *F05D 2250/182* (2013.01); *F05D 2250/75* (2013.01); *F05D 2260/205* (2013.01); *Y02T 50/60* (2013.01)

(58) Field of Classification Search
CPC ... F01D 11/005; F01D 25/246; F16J 15/0887; F16J 15/104; F05D 2240/55
See application file for complete search history.

(56) References Cited

U.S. PATENT DOCUMENTS

| | | | |
|---|---|---|---|
| 4,783,085 A | 11/1988 | Wicks et al. | |
| 5,014,917 A | 5/1991 | Sirocky et al. | |
| 7,090,224 B2 * | 8/2006 | Iguchi | F01D 11/005 |
| | | | 277/603 |
| 7,121,790 B2 | 10/2006 | Fokine et al. | |
| 7,347,425 B2 | 3/2008 | James | |
| 8,651,497 B2 | 2/2014 | Tholen et al. | |
| 9,512,735 B2 * | 12/2016 | Davis | F01D 11/005 |
| 9,879,780 B2 * | 1/2018 | Rogers | F16J 15/0887 |
| 10,202,862 B2 * | 2/2019 | Davis | F16J 15/104 |
| 10,344,609 B2 * | 7/2019 | Davis | F16J 15/0806 |
| 10,487,678 B2 * | 11/2019 | Tyler, Jr. | F01D 11/005 |
| 2009/0243228 A1 | 10/2009 | Heinemann et al. | |

(Continued)

*Primary Examiner* — Eugene G Byrd
(74) *Attorney, Agent, or Firm* — Cantor Colburn LLP

(57) ABSTRACT

The present disclosure relates generally to a sliding seal between two components. The sliding seal includes a first seal section, a second seal section, and (in some embodiments) a third seal section. Two or three of the seal sections are uncoupled, which allows the uncoupled seal sections to move relative to one another during relative movement between the two components. One or more spring tabs extend from the second seal section and bias the first and third (or in some embodiments, the first and second) seal sections away from one another.

18 Claims, 17 Drawing Sheets

FORWARD ← → AFT

(56) References Cited

U.S. PATENT DOCUMENTS

2011/0303862 A1* 12/2011 Batson ................ F16J 15/0887
              251/172
2013/0113168 A1   5/2013 Lutjen et al.
2016/0115807 A1*  4/2016 Davis ................... F16J 15/0887
              277/592
2016/0208632 A1*  7/2016 Davis ................... F16J 15/0887
2016/0258308 A1*  9/2016 Davis ................... F01D 11/005
2016/0265377 A1*  9/2016 Lutjen .................. F16J 15/104

* cited by examiner

FORWARD ⟵⟶ AFT

FORWARD ←→ AFT

SLIDING SEAL

CROSS REFERENCE TO RELATED APPLICATION

This application is a divisional of U.S. patent application Ser. No. 14/681,578 filed on Apr. 8, 2015, the entire contents of which are incorporated herein by reference thereto.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a seal cavity defined by first and second adjacent components disposed about an axial centerline is disclosed, the seal comprising: a first seal section comprising a first split hoop; and a second seal section comprising a second split hoop and a spring element; a third seal section; wherein the spring element contacts the first seal section and is configured to axially load the first seal section against one of the first and second components; wherein the second split hoop contacts the third seal section and is configured to axially load the third seal section against another one of the first and second components; and wherein at least two of the first, second and third seal sections are configured to move relative to one another.

In a further embodiment of the above, the first seal section is configured to sealingly engage with the first and second components.

In a further embodiment of any of the above, the third seal section comprises a split hoop.

In a further embodiment of any of the above, the first seal section comprises a first seal section free-state inner diameter that is smaller than a seal cavity inner diameter, such that a radial preload is achieved between the first seal section and at least one of the first and second components.

In a further embodiment of any of the above, the spring element comprises a plurality of first spring tabs frustoconically but primarily radially extending from said second split hoop.

In a further embodiment of any of the above, the hoop and the plurality of first spring tabs are integrally formed.

In a further embodiment of any of the above, one of a W-seal or M-seal is disposed within the seal cavity radially outboard from the first, second, and third seal sections.

In a further embodiment of any of the above, the seal is formed from one of a high-temperature metal alloy, a high-temperature metal alloy, a high-temperature ceramic material, and a high-temperature ceramic composite, or a combination of two or more of a high-temperature metal alloy, a high-temperature metal alloy, a high-temperature ceramic material, and a high-temperature ceramic composite.

In a further embodiment of any of the above, a slot is formed in the third seal section, wherein a portion of the second seal section is disposed within the slot.

In a further embodiment of any of the above, the second split hoop and the spring element are discrete pieces joined at their radially outboard ends.

In a further embodiment of any of the above, a wear-resistant ring is coupled to a surface of the third seal section, wherein the third seal section is separated from direct contact with the first and second adjacent components.

In a further embodiment of any of the above, a slot is formed in the first seal section, wherein at least a portion of the second seal section is disposed within the slot.

In a further embodiment of any of the above, the second seal section is joined to one of the first seal section and the third seal section.

In a further embodiment of any of the above, the second seal section is joined to one of the first seal section and the third seal section by a weld disposed at one circumferential location.

In a further embodiment of any of the above, the first seal section includes a groove and the third seal section includes a tongue disposed within the groove.

In a further embodiment of any of the above, the third seal section is L-shaped in cross-section.

In another embodiment, a seal for sealing a seal cavity defined by first and second adjacent components disposed about an axial centerline is disclosed, the seal comprising: a first seal section comprising a first split hoop; and a second seal section comprising a second split hoop and a spring element; wherein the spring element contacts the first seal section and is configured to axially load the first seal section against one of the first and second components; wherein the second split hoop is in contact with another one of the first and second components; and wherein the first and second seal sections are configured to move relative to one another.

In a further embodiment of any of the above, the second split hoop comprises a substantially axially-extending portion in contact with the first seal section and a substantially radially-extending portion in contact with another one of the first and second components.

In another embodiment, a seal for sealing a seal cavity defined by first and second adjacent components disposed about an axial centerline is disclosed, the seal comprising: a first seal section comprising a first split hoop; and a second seal section comprising a scissors-type spring element comprising a plurality of first spring tabs and a plurality of second spring tabs; a third seal section; wherein the plurality of first spring tabs contact the first seal section and the plurality of second spring tabs contact the third seal section;

wherein at least two of the first, second and third seal sections are configured to move relative to one another.

In a further embodiment of any of the above, the first plurality of spring tabs and the second plurality of spring tabs defined a cavity therebetween, the seal further comprising a compliant seal disposed within the cavity.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
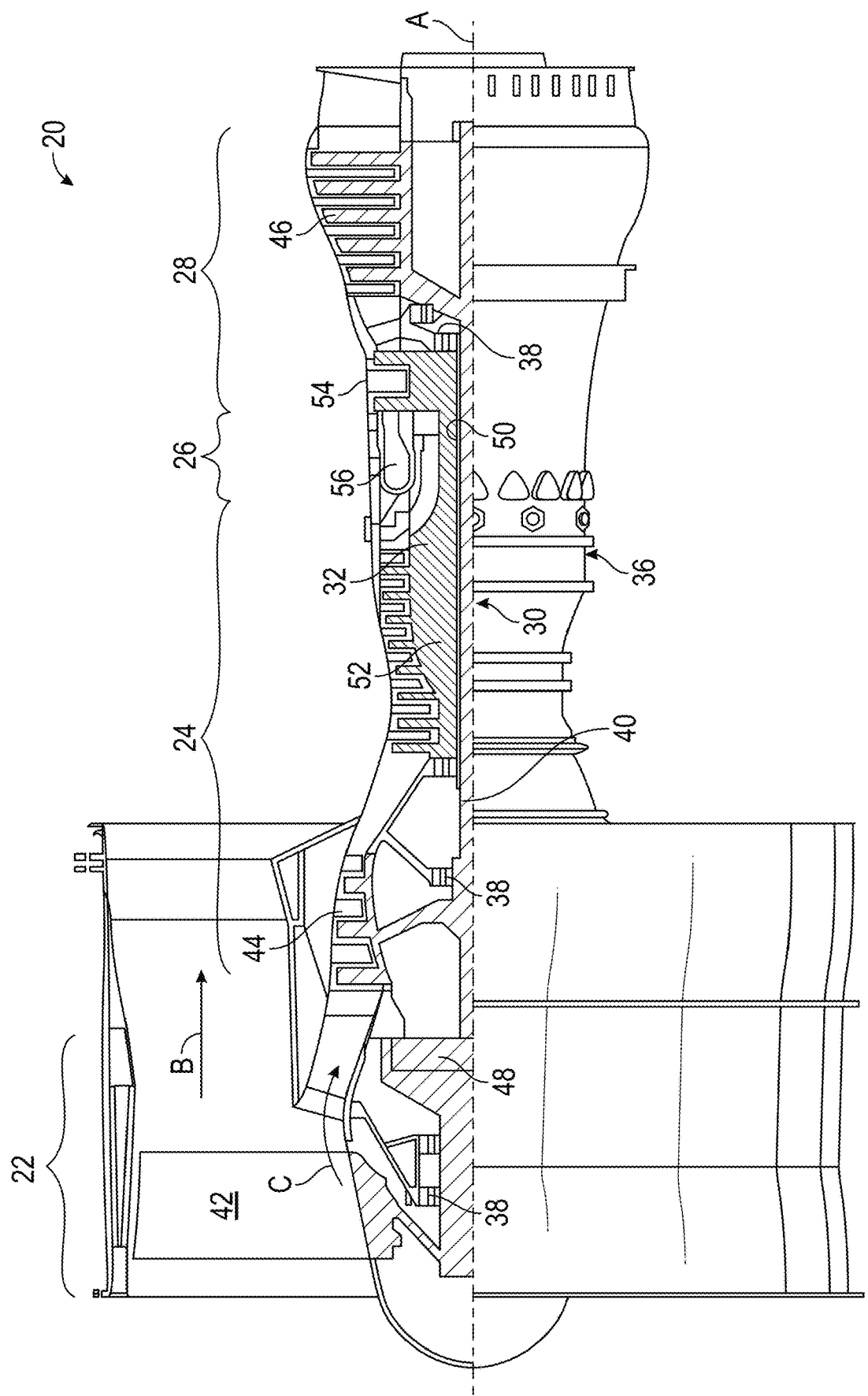
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
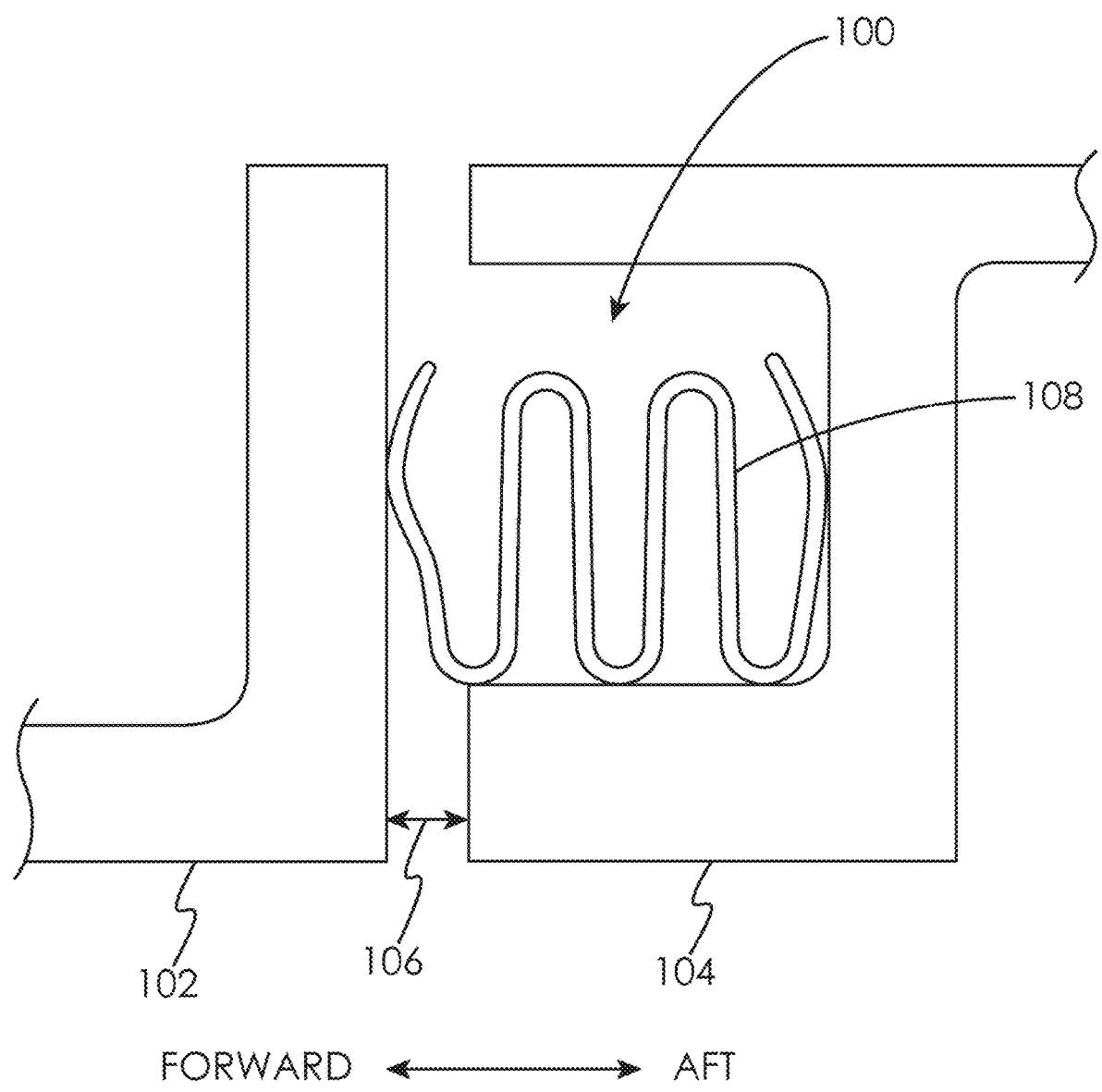
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3A:
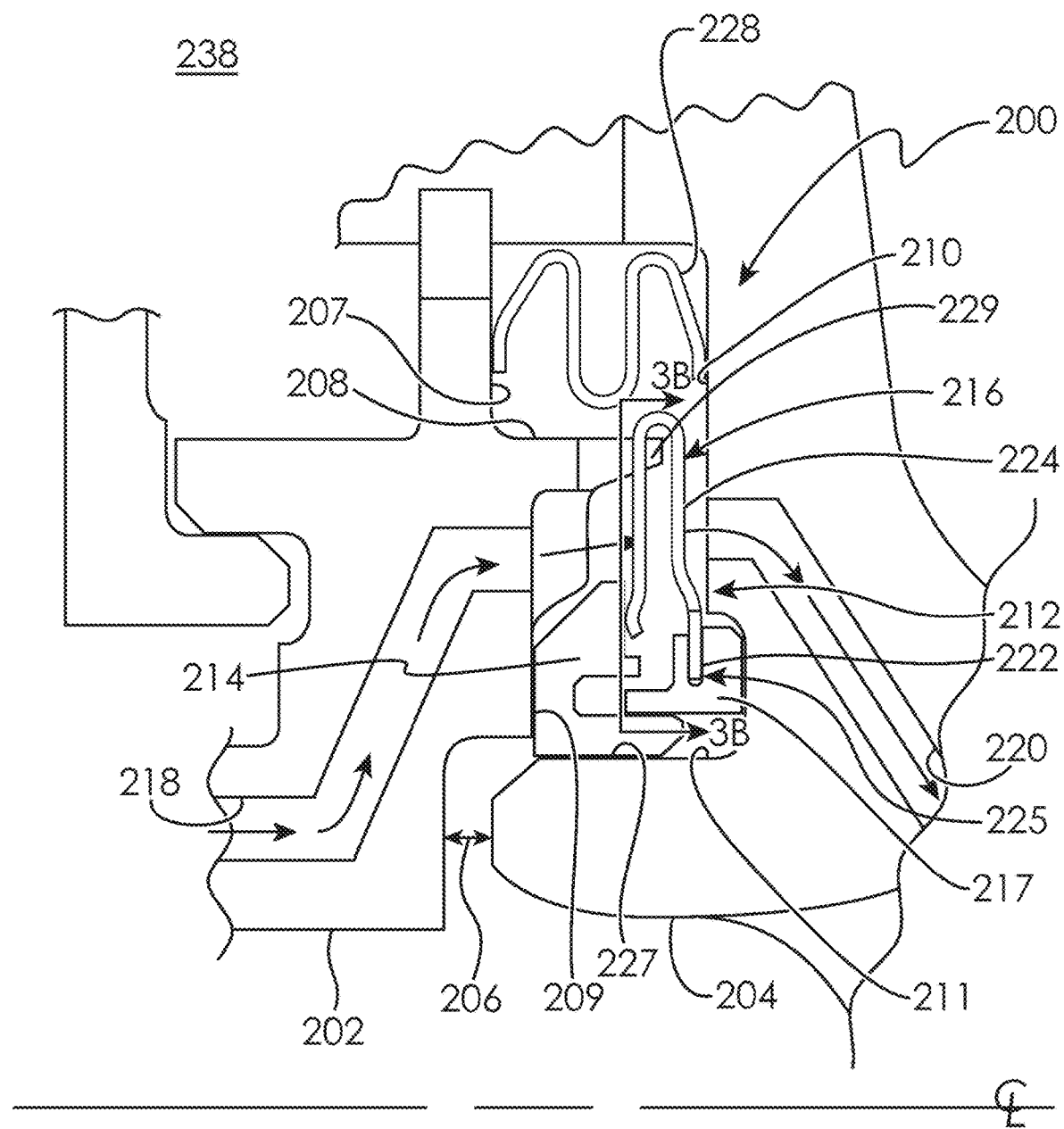
FIG. 3A is a schematic cross-sectional view of a seal and seal cavity in an embodiment.

FIG. 3A schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a generally-radially-extending surface 207, a generally axially-extending surface 208, and a generally-radially-extending surface 209 facing the seal cavity 200. The component 204 includes a generally radially-extending surface 210 and a generally axially-extending surface 211 facing the seal cavity 200. Within the seal cavity 200 lies a seal 212 formed from a material appropriate to the anticipated operating conditions of the seal 212, such as a high-temperature metal alloy, a low temperature metal alloy, a high temperature ceramic material, a high temperature ceramic composite, or a combination of two or more of these, to name just a few non-limiting examples. In some, but not all, embodiments, a secondary gas flow path 218 is formed through component 202 and a secondary gas flow path 220 is formed through component 204.

The seal 212 is formed from a first seal section 214, a second seal section 216, and a third seal section 217. The first seal section 214 is a split-hoop seal ring that contacts, slides, and seals against both components 202 and 204. The first seal section 214 may load radially inward against the surface 211 of component 204 via a preload that is achieved by an inner diameter of the first seal section 214 in the free-state that is smaller than the inner diameter of the seal cavity 200 at the surface 211. The relatively high stiffness and moment of inertia of the first seal section 214 enables this preload and helps to resist rolling of the first seal section 214. A pressure differential across the first seal section 214 provides additional axial loading against the surface 209 of the component 202 and radial loading against the surface 211 of the component 204.

Figure 3B:
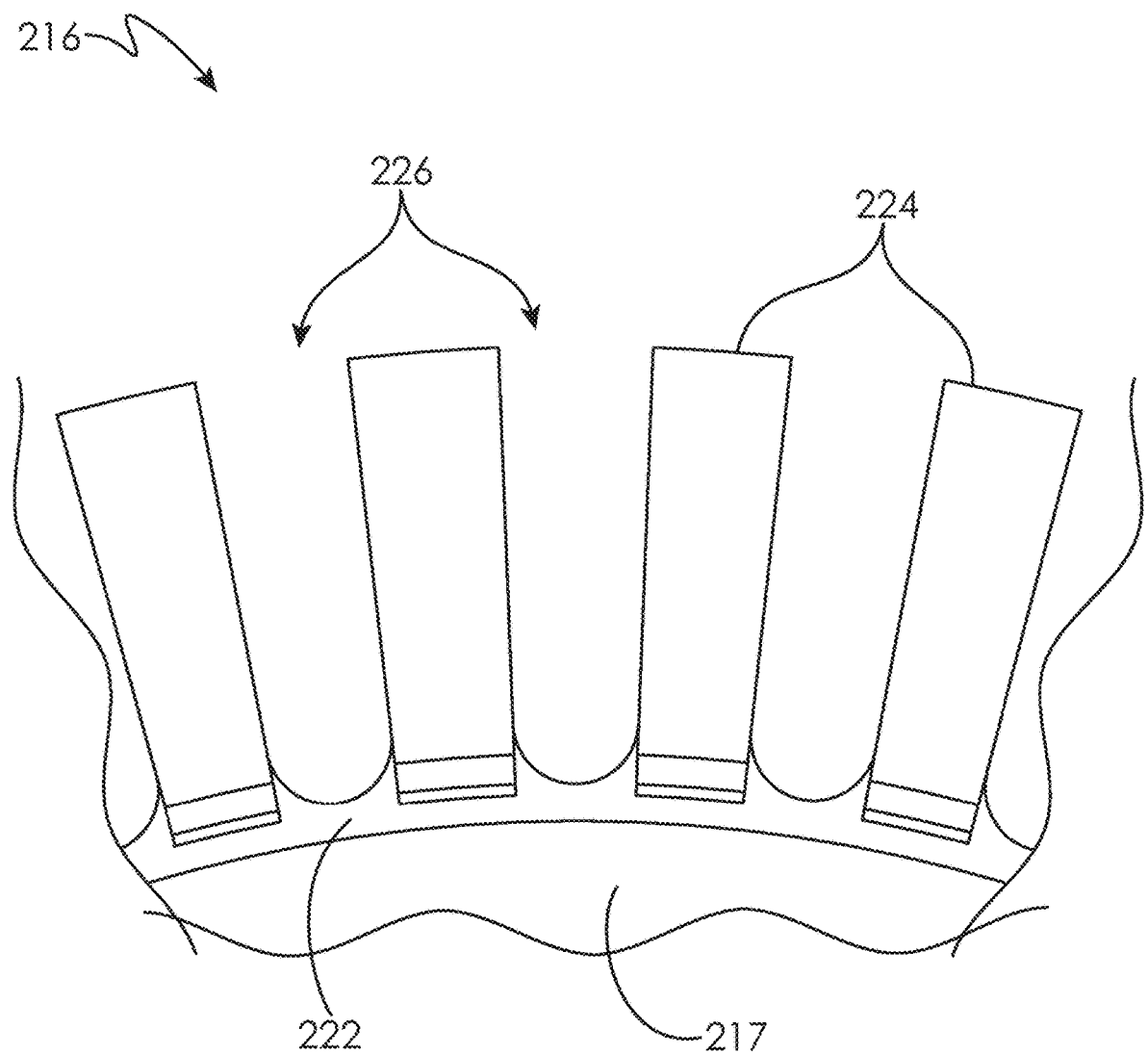
FIG. 3B is a schematic elevational view of a section of the seal of FIG. 3A in an embodiment.

The second seal section 216 comprises a split-hoop spring element that is operative to load the first seal section 214 axially forward against the surface 209 of the component 202. In an embodiment, the second seal section 216 may comprise a generally radially-extending hoop 222 with a single split at one location and a plurality of U-shaped but primarily radially projecting spring tabs 224 spaced around its radially outer circumference. The spring tabs 224 may be integrally formed with the seal section 216, or they may be discrete pieces attached thereto. As best shown in FIG. 3B, a plurality of slots 226 are formed in the second seal section 216 between adjacent spring tabs 224. Although the spring tabs 224 are illustrated as having substantially the same circumferential width as the slots 226, it will be appreciated that in some embodiments the spring tabs 224 may be circumferentially narrower than the slots 226, or the spring tabs 224 may be circumferentially wider than the slots 226. These slots 226 allow gases in the secondary flow path 218 to flow into the seal cavity 200 and continue into the secondary flow path 220. In some embodiments, such as when secondary gas flow paths 218 and 220 are not present, the second seal section 216 may not include any spring tabs 224 or slots 226, such that the second seal section 216 provides a seal between the first seal section 214 and the third seal section 217. In some embodiments, circumferential movement of the second seal section 216 with respect to the component 202 may be limited by at least one tab 229 extending from component 202 and into a slot 226 of the second seal section 216.

The hoop 222 may be disposed within a slot 225 formed into the third seal section 217. The spring tabs 224 bias the seal sections 214, 217 axially away from one another, causing the seal section 214 to seat against the surface 209 of the component 202 and the seal section 217 to seat against the surface 210 of the component 204, even when the cavity 200 is not pressurized. This mitigates risk of damage to the seal 212 in transportation and ensures that the seal 212 is instantly and positively pressurized/pressure-energized at engine start-up. The seal 212 may include a coating and/or a sheath to provide increased wear resistance. A W-seal (or M-seal) 228 may be positioned within the seal cavity 200 radially outboard from the seal 212 and engage the surface 207 of component 202 and the surface 210 of component 204. In some embodiments, the W-seal (or M-seal) 228 is omitted.

Pressure in a secondary flow cavity 238 is transmitted to the seal cavity 200 through an opening defined by the components 202, 204. This pressure acts upon the surfaces of the seal sections 214, 216, 217, thereby causing the first seal section 214 to seat against the surface 209 of the component 202 and the surface 211 of the component 204, and also causing the third seal section 217 to seat against the surface 210 of the component 204 and the surface 227 of the first seal section 214. As the aft component 204 moves axially relative to the forward component 202, the axially-preloaded spring tabs 224 cause the hoop section 222 of the second seal section 216, and therefore also the third seal section 217, to move with the component 204 so that a restriction is created that is beneficially redundant with the w-seal 228. The third seal section 217 slides upon the surface 227 of the first seal section 214 during such axial movement. The load applied by spring tabs 224 to the first seal section 214 helps the first seal section 214 to seat against the surface 209 of the component 202. The load applied by spring tabs 224 to the first seal section 214 additionally helps the third seal section 217 to seat against the surface 210 of the component 204. This prevents most or all of the secondary flow cavity 238 gases from reaching the design clearance 206 area and flow path. As the two components 202 and 204 move relative to each other in the axial and/or radial direction, the seal sections 214, 216, 217 are free to slide relative to one another in the axial and radial directions (against the spring force of the spring tabs 224) and circumferential direction, while the pressure forces acting upon the surfaces of the seal sections 214, 217 loads the seal 212 so that it remains in contact with both components 202 and 204 as shown. Therefore, sealing is maintained while the components 202 and 204 and the components of the seal 212 move relative to one another. Because the seal sections 214, 216, 217 slide with respect to one another and with respect to the components 202, 204, the seal 212 is not substantially deflected by the relative movement between the components 202 and 204 other than at the spring tabs 224.

Furthermore, the spring tabs 224 push the seal section 214 to remain in contact with the forward wall 209, and also push the seal section 217 to remain in contact with the aft wall 210 when the cavity 200 is not pressurized. This prevents the seal 212 from being damaged during transportation and installation, and also ensures that the seal 212 is instantly and positively pressurized/pressure-energized at engine start-up. Splitting the seal section 214 also creates an additional sealing surface at the bottom of the seal cavity 200, as well as allowing the seal 212 to be packaged within a smaller radial design space. Splitting the seal section 217 also creates an additional sealing surface at the surface 227 of the first seal section 214, as well as allowing the seal 212 to be packaged within a smaller radial design space.

The second seal section 216 is shielded from hot gas path heat loads (i.e. convection and radiation) at the design clearance 206 so that a lower-temperature, higher-strength, more-resilient material (for example, Inconel®. 718 to name just one non-limiting example) may be used. The first seal section 214 and second seal section 217 are not flexed/stressed, so that a lower-strength, higher-temperature, more wear resistant material (for example, a cobalt alloy to name just one non-limiting example) may be used. The heavy thicknesses of the first seal section 214 and third seal section 217 also makes them more wear tolerant.

Figure 4A:
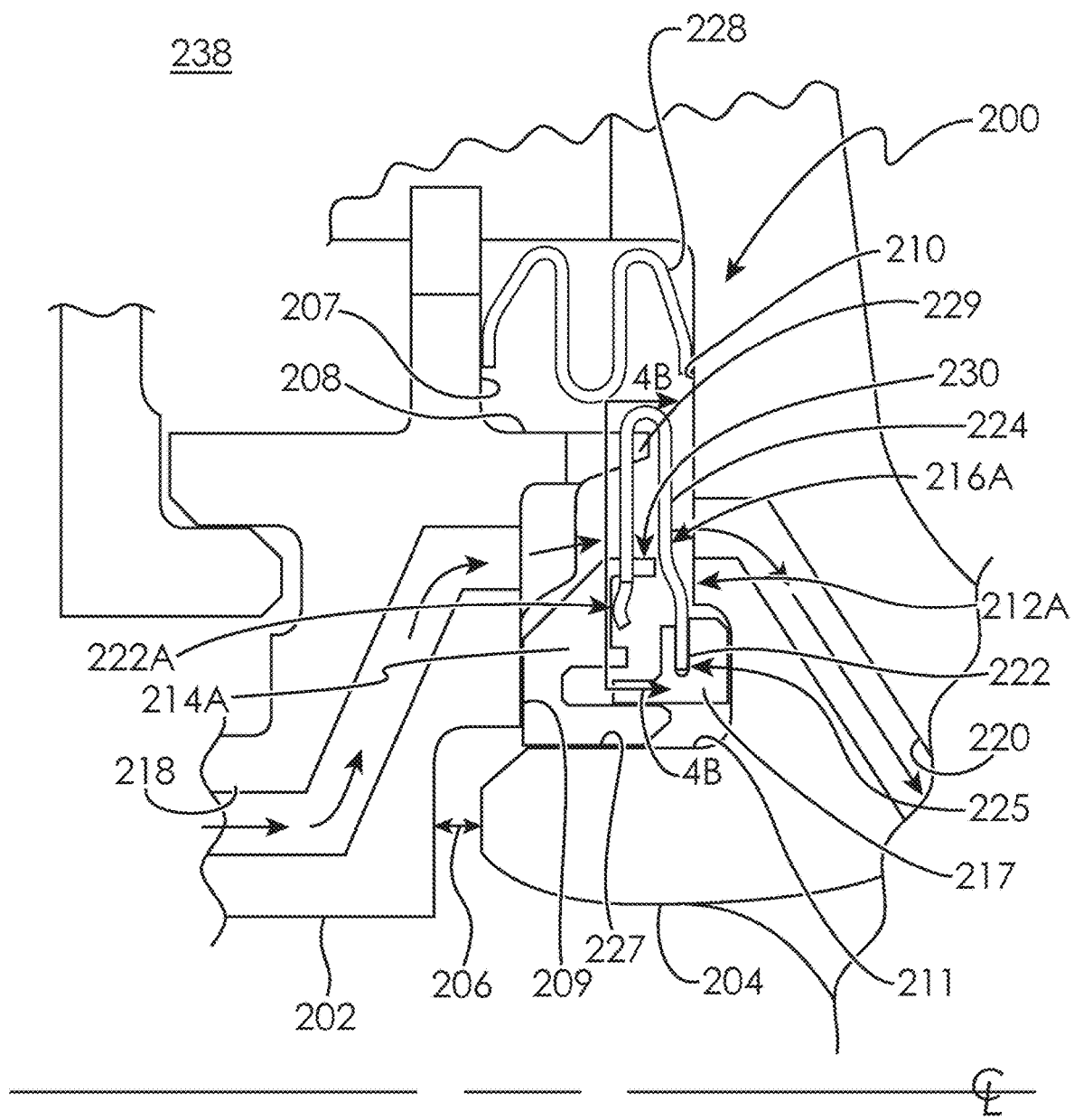
FIG. 4A is a schematic cross-sectional view of a seal and seal cavity in an embodiment.
Figure 4B:
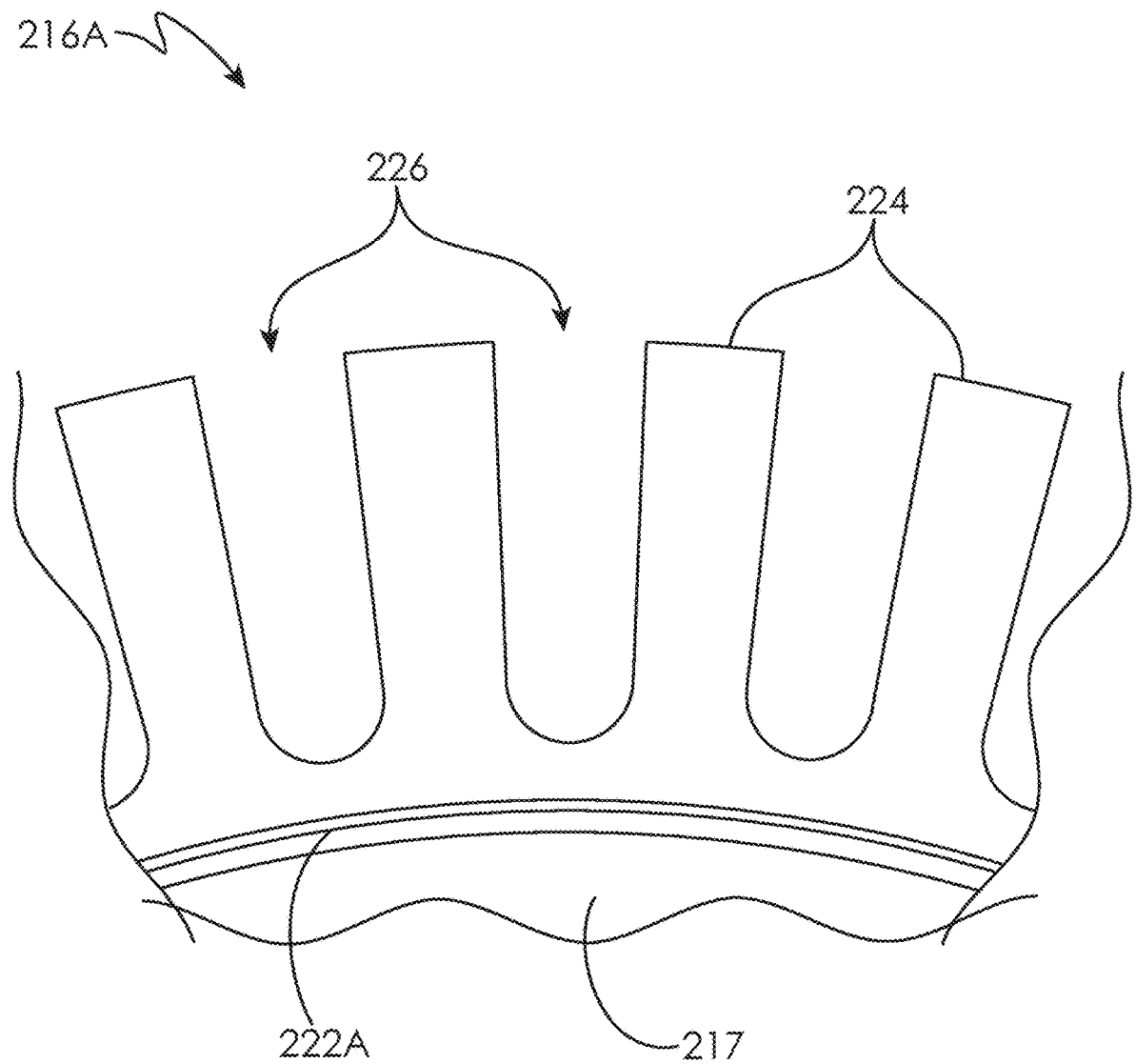
FIG. 4B is a schematic elevational view of a section of the seal of FIG. 4A in an embodiment.

Another embodiment of the seal 212 is illustrated in FIGS. 4A and 4B and designated as 212A. In the seal 212A, the split hoop 222A is disposed adjacent the first seal section 214A and carries the spring tabs 224A, the axially aft ends of which are received within the slot 225 of the third seal section 217. In some embodiments, the first seal section 214 may include at least one axially-extending tab 230 disposed within a slot 226 to limit radially-outboard travel of the second seal section 216A.

Figure 5:
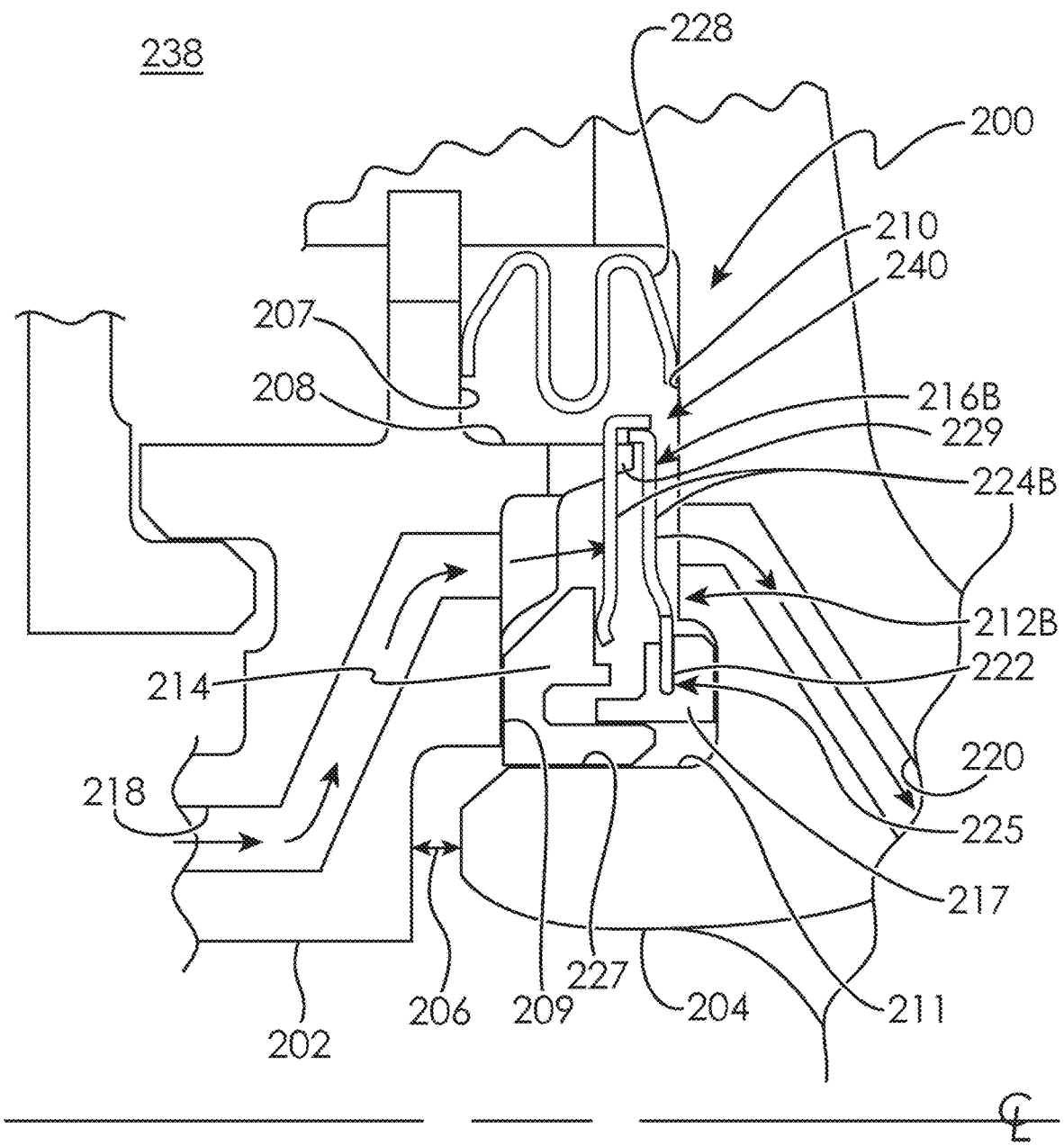
FIG. 5 is a schematic cross-sectional view of a seal and seal cavity in an embodiment.

Another embodiment of the seal 212 is illustrated in FIG. 5 and designated as 212B. In the seal 212B, the second seal section 216B comprises spring tabs 224B formed from two pieces joined at their radially-outboard ends 240, which may be more manufacturable than the single-piece seal section 216 of FIGS. 3A-B.

Figure 6:
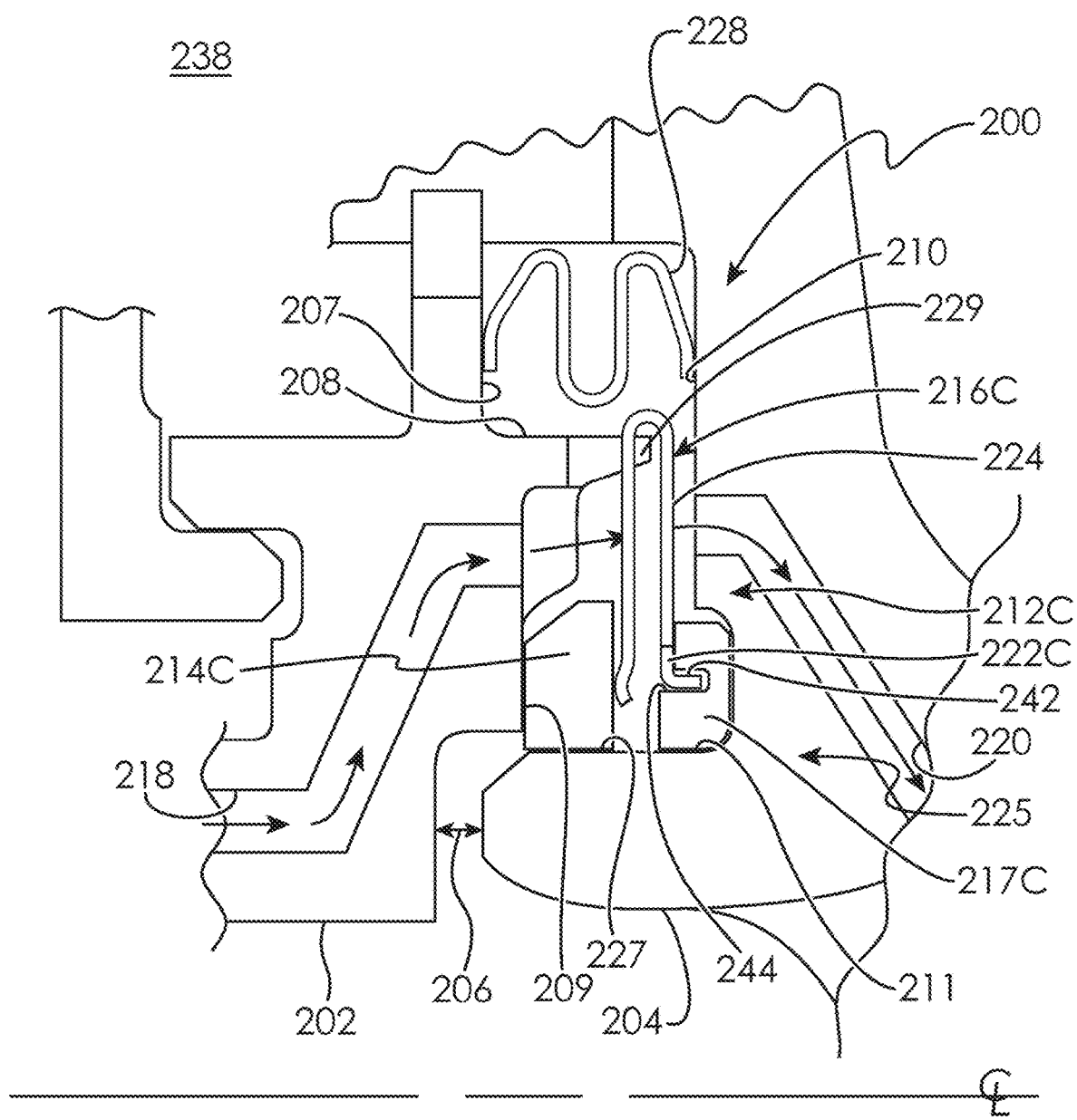
FIG. 6 is a schematic cross-sectional view of a seal and seal cavity in an embodiment.

Another embodiment of the seal 212 is illustrated in FIG. 6 and designated as 212C. In the seal 212C, a split hoop 222C includes an axially-extending portion 242 positioned within a slot 244 formed in an axially-forward surface of the third seal section 217C. In one embodiment, the third seal section 217C does not contact the first seal section 214C.

Figure 7:
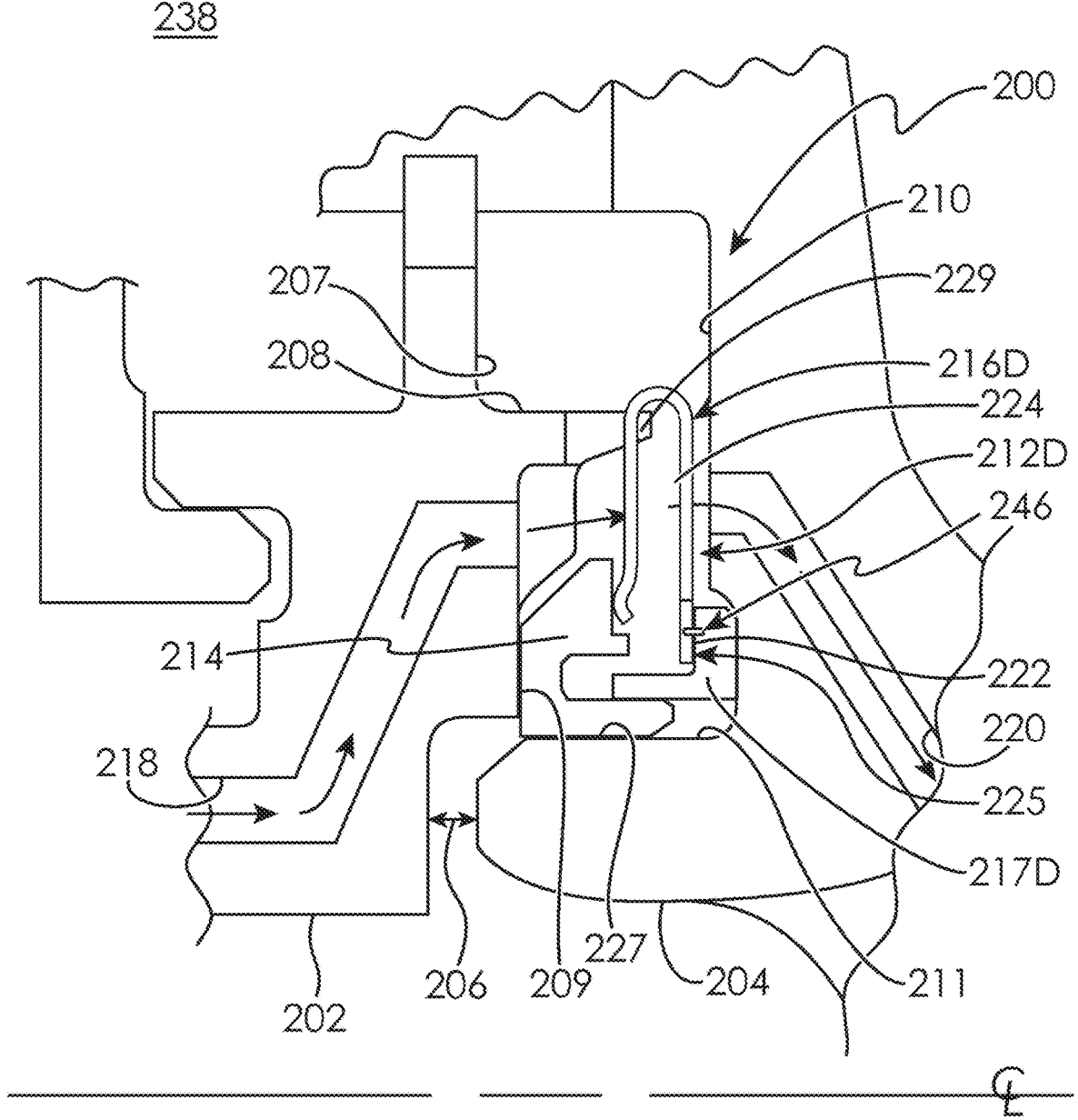
FIG. 7 is a schematic cross-sectional view of a seal and seal cavity in an embodiment.

Another embodiment of the seal 212 is illustrated in FIG. 7 and designated as 212D. In the seal 212D, the second seal section 216D is joined to the third seal section 217D. In other embodiments, the second seal section 216D may be joined to the first seal section 214. The joining of the second seal section 216D to either the first seal section 214 or the third seal section 217D may be by any desired means, such as by welds 246 to name just one non-limiting example. The weld 246 may be limited to one circumferential location to prevent stress caused by differential rates of expansion between the two seal sections (e.g., when the two seal sections are formed from two dissimilar materials having differing coefficients of thermal expansion).

Figure 8:
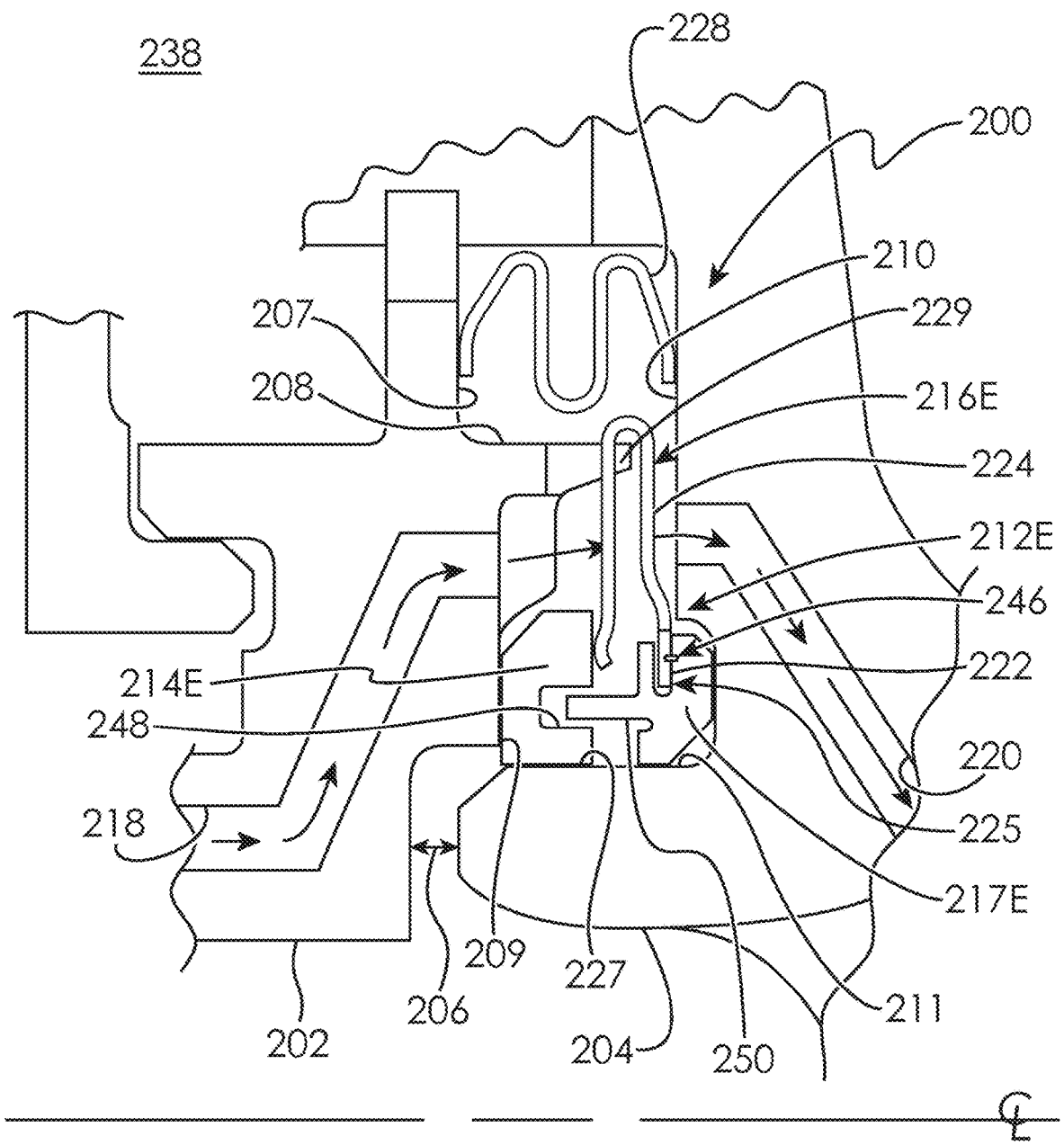
FIG. 8 is a schematic cross-sectional view of a seal and seal cavity in an embodiment.

Another embodiment of the seal 212 is illustrated in FIG. 8 and designated as 212E. In the seal 212E, both the first seal section 214E and the third seal section 217E contact the surface 211 of the component 204. Additionally, the first seal section 214E includes a groove 248 into which a tongue 250 extending from the third seal section 217E may extend. In other embodiments, the first seal section 214E includes the tongue 250 and third seal section 217E includes the groove 248. The tongue and groove combination 248, 250 allow for relative axial movement between the first seal section 214E and the third seal section 217E, while reducing leakage flow between the first seal section 214E and the third seal section 217E. The seal section 216E may be joined to the seal section 217E by means of a weld 246.

Figure 9:
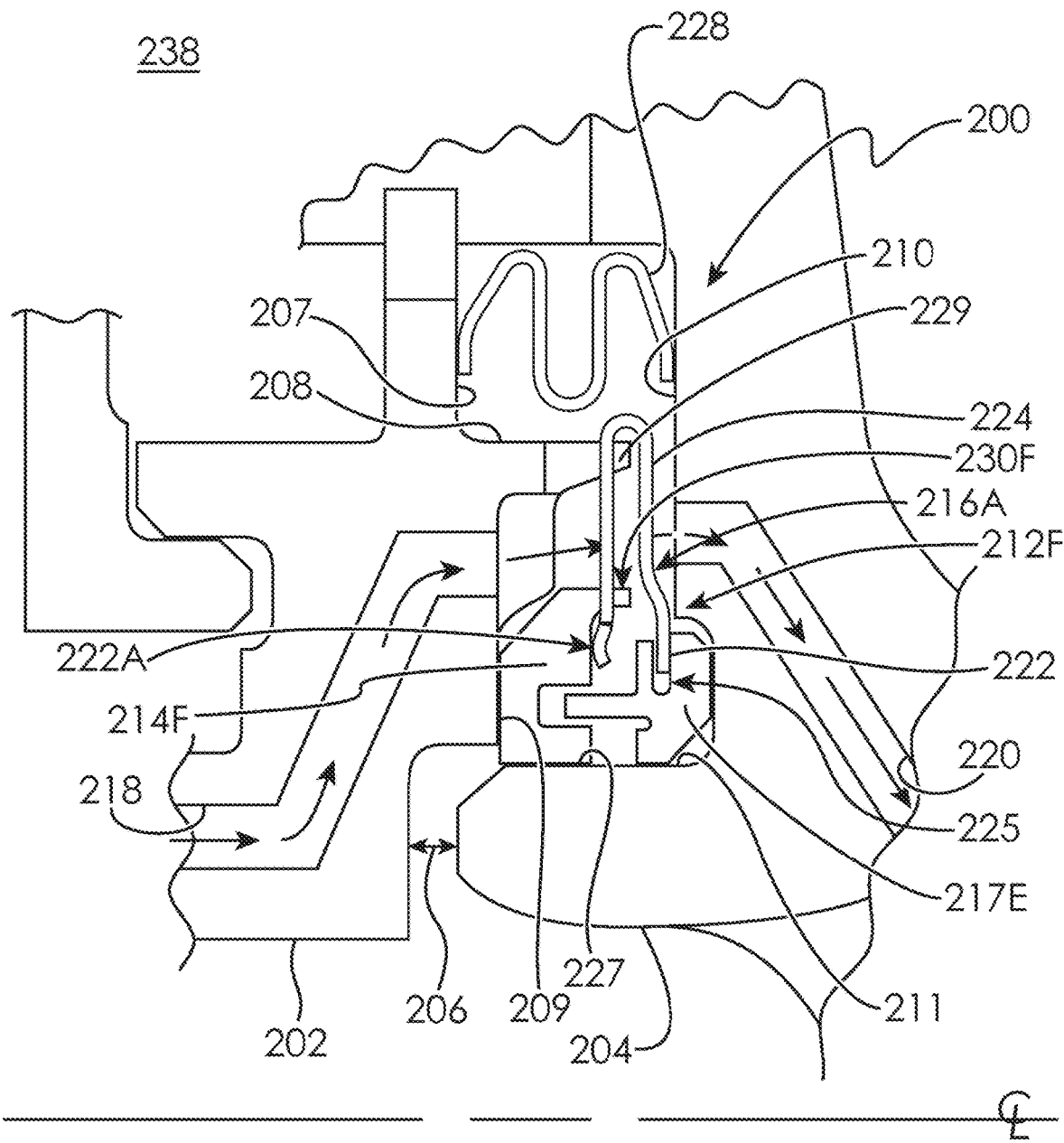
FIG. 9 is a schematic cross-sectional view of a seal and seal cavity in an embodiment.

Another embodiment of the seal 212 is illustrated in FIG. 9 and designated as 212F. The seal 212F is similar to the seal 212E of FIG. 8, but the second seal section 216A of FIG. 4A is used. In some embodiments, the first seal section 214F may include at least one axially-extending tab 230F disposed within a slot 226 to limit radially-outboard travel of the second seal section 216A.

Figure 10:
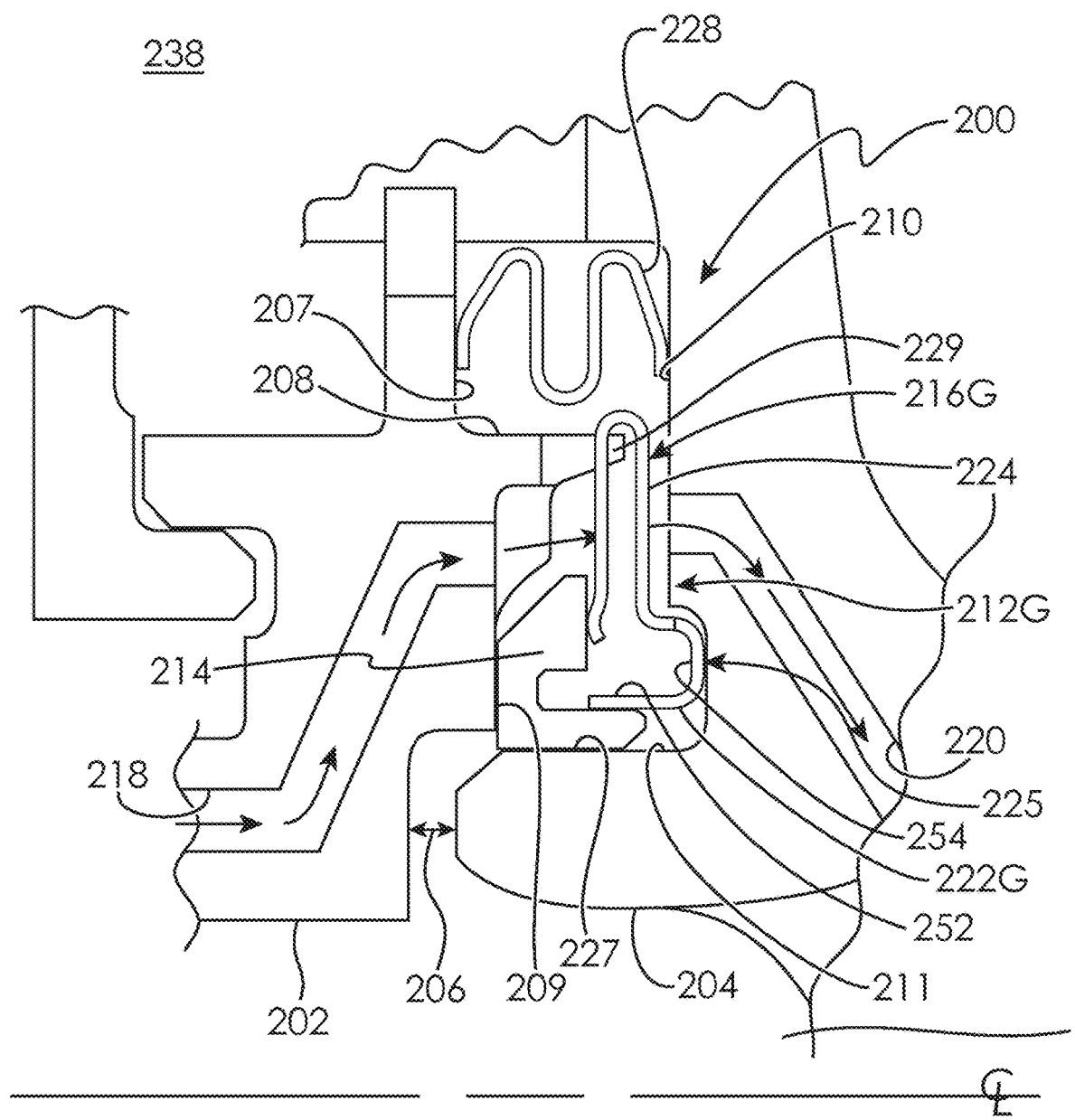
FIG. 10 is a schematic cross-sectional view of a seal and seal cavity in an embodiment.

Another embodiment of the seal 212 is illustrated in FIG. 10 and designated as 212G. The seal 212G is similar to the seal 212 of FIGS. 3A-B, but the third seal section 217 is eliminated. A split hoop 222G of second seal section 216G includes a generally axially-extending portion 252 in contact with the first seal section 214, and a substantially radially-extending portion 254 in contact with the component 204 to maintain a seal therebetween.

Figure 11:
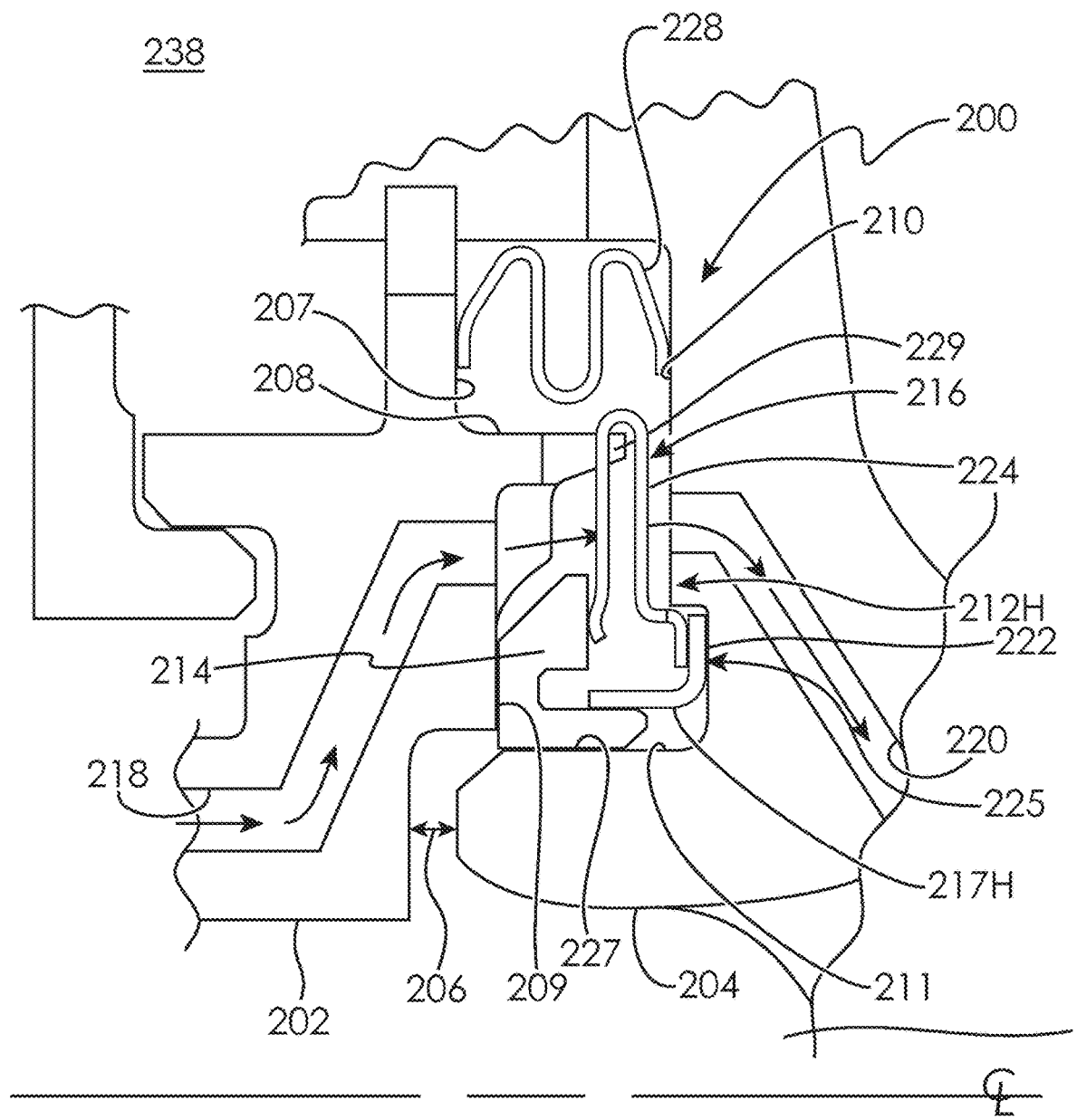
FIG. 11 is a schematic cross-sectional view of a seal and seal cavity in an embodiment.

Another embodiment of the seal 212 is illustrated in FIG. 11 and designated as 212H. The seal 212H is similar to the seal 212 of FIGS. 3A-B, but the third seal section 217H is L-shaped in cross-section. The third seal section 217H may be beneficial for wear resistance and/or wear resilience (e.g., formed from a thicker material such as a cobalt alloy, to name just one non-limiting example). The third seal section 217H may also be beneficial for temperature capability (e.g., formed from a cobalt alloy or non-hardenable nickel-base alloy, to name just two non-limiting examples). The third seal section 217H may also be more manufacturable due to its simpler design.

Figure 12:
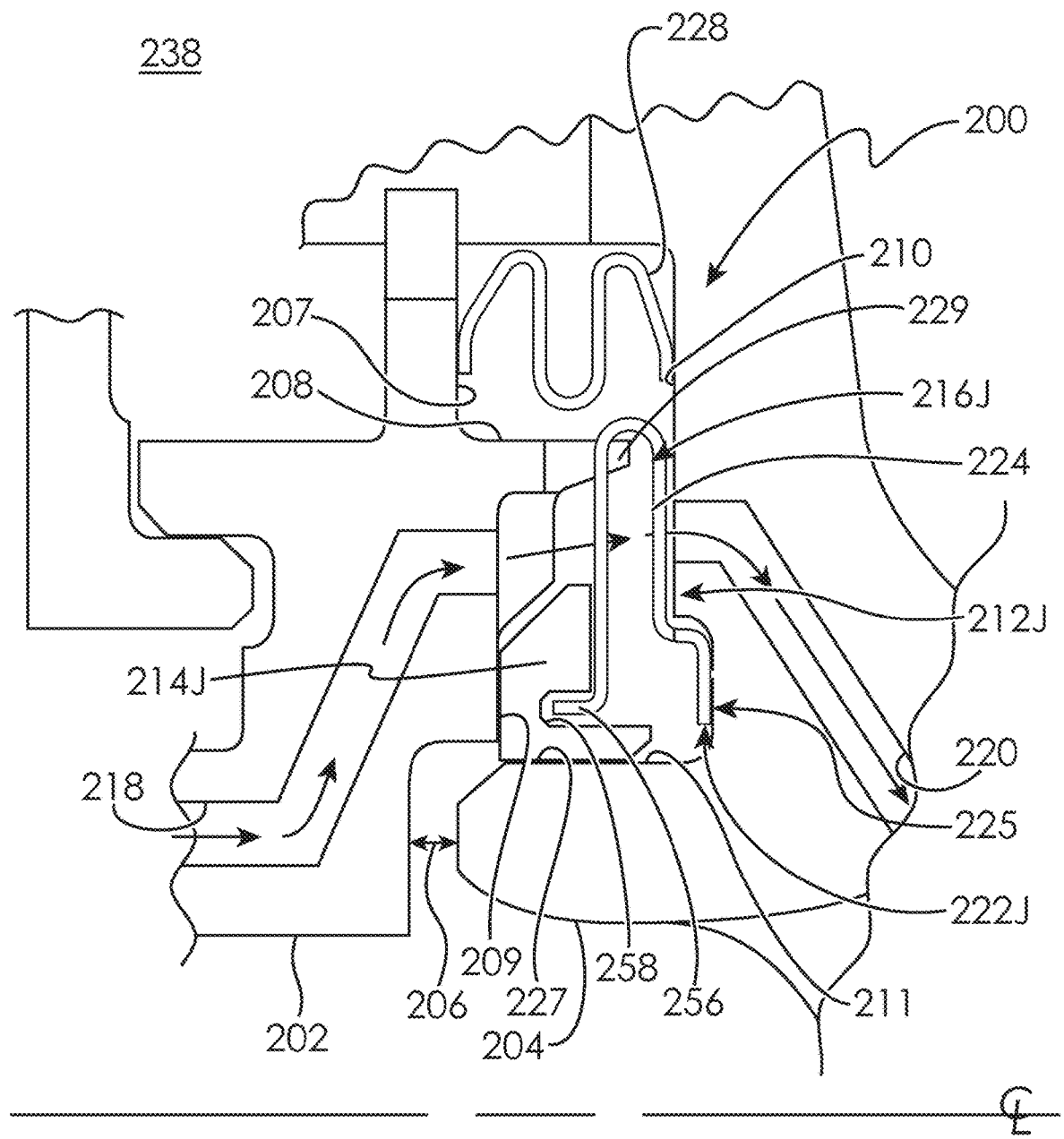
FIG. 12 is a schematic cross-sectional view of a seal and seal cavity in an embodiment.
Figure 13:
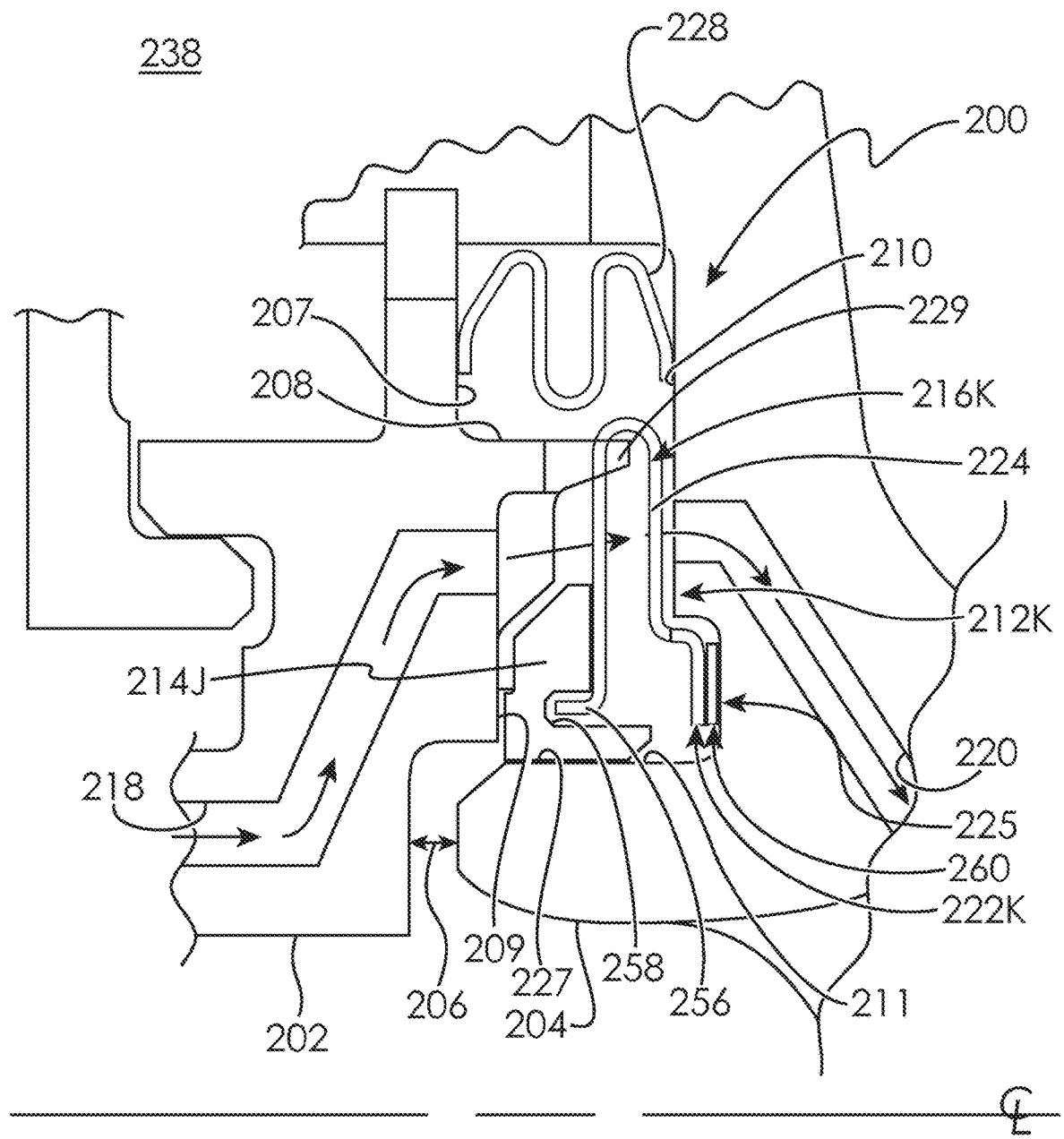
FIG. 13 is a schematic cross-sectional view of a seal and seal cavity in an embodiment.

Another embodiment of the seal 212 is illustrated in FIG. 12 and designated as 212J. The seal 212J is similar to the seal 212G of FIG. 10, but the split hoop 222J does not contact the first seal section 214J. The second seal section 216J includes an axially-extending portion 256 disposed within a groove 258 formed in the aft side of the first seal section 214J. The split hoop 222J seals directly against the component 204. Another embodiment of the seal 212 is illustrated in FIG. 13 and designated as 212K. The seal 212K is similar to the seal 212J of FIG. 12, but a compliant, high-temperature ceramic fiber material 260 (for example, NEXTEL ceramic textile available from The 3M Company of Maplewood, Minn. USA, to name just one non-limiting example) is disposed between the split hoop 222K of the second seal section 216K and the component 204. In another embodiment, the additional ring 260 may be made from a cobalt alloy. The additional ring 260 may be added to any of the embodiments disclosed herein.

Figure 14:
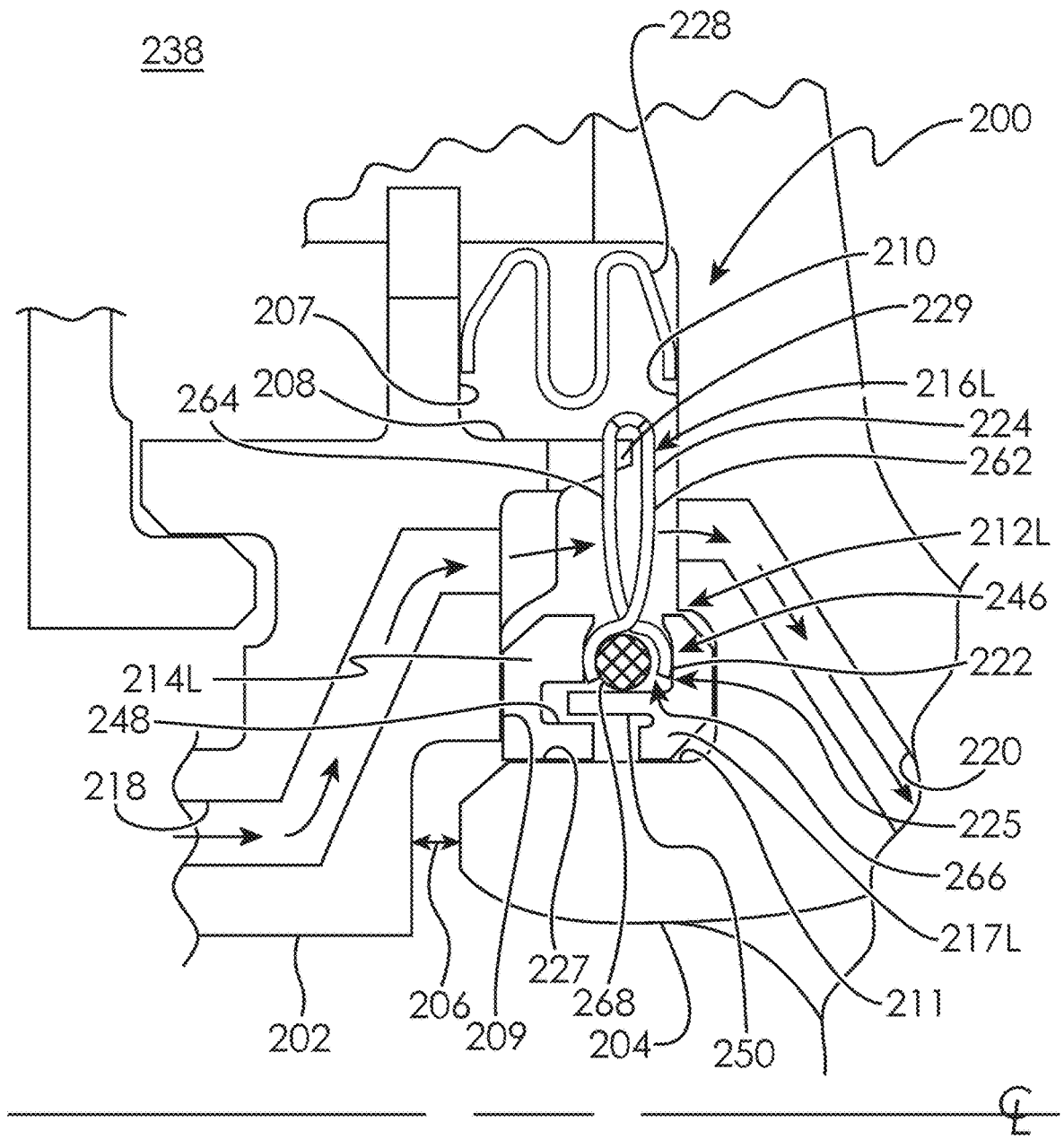
FIG. 14 is a schematic cross-sectional view of a seal and seal cavity in an embodiment.
Figure 15:
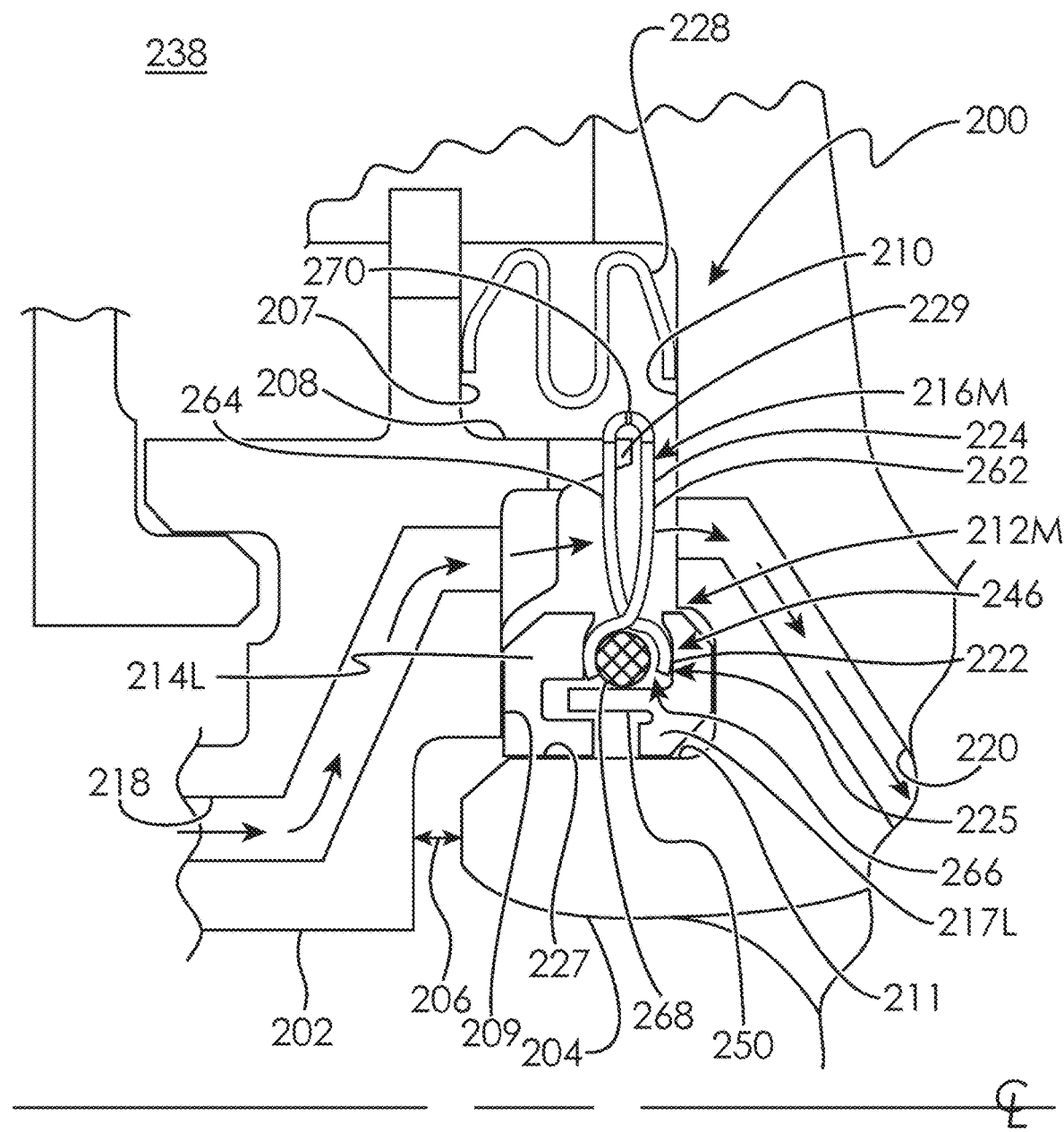
FIG. 15 is a schematic cross-sectional view of a seal and seal cavity in an embodiment.

Another embodiment of the seal 212 is illustrated in FIG. 14 and designated as 212L. The seal 212L is similar to the seal 212E of FIG. 8, but the second seal section 216L comprises a scissors-type spring. The second seal section 216L includes first spring tabs 262, which engage the first seal section 214L, that alternate with second spring tabs 264, which engage the third seal section 217L. The second seal section 216L provides a cavity 266 in which is disposed a compliant seal (e.g., a rope seal) 268. The compliant seal 268 may comprise a braided ceramic rope seal, to name just one non-limiting example. The cavity 266 completely traps the compliant seal 268 while maintaining a constant-height cavity regardless of how much the second seal section 216L is compressed. The compliant seal 268 is pressure loaded into the forward end of the cavity 266 to further restrict leakage flow. Another embodiment of the seal 212 is illustrated in FIG. 15 and designated as 212M. The seal 212M is similar to the seal 212L of FIG. 14, but is formed in two pieces and joined at 270. The joining of the two pieces may be by any desired means, such as by welding to name just one non-limiting example.

Compared to the seal 108, the seal 212 exhibits improved durability (i.e. much more robust) relative to a w-seal 108. The first seal section 214 and third seal section 217 are more wear tolerant and wear resistant because the wall thickness is much greater, and a more-lubricious (lower-strength) material can be used. Because of the design of the seal 212, the first seal section 214 and the second seal section 216 have higher temperature capability. The first seal section 214 and third seal section 217 can be made from a higher-temperature material since they are not flexed/strained/stressed. The second seal section 216 can be made from a higher-strength material because it is shielded from the gas path as well as the hottest surfaces of the components 202/204. The seal 212 may exhibit improved vibration tolerance due to thicker walls and friction damping. The seal 212 is more resilient because the spring tabs of the second seal section 216 are: a) significantly taller than the w-seal 108, and b) are local/narrow features rather than a continuous hoop. The seal 212 potentially has a higher moment of inertia to enable more radial preload to be achieved and to resist rolling of the first seal section 214 and the third seal section 217. The seal 212 also exhibits potentially improved sealing. In addition to sealing at forward and aft axial contact surfaces, there is also sealing the surface 211 of component 204, and this additional/radial contact may be a superior seal to stair-stepped forward/aft surfaces. Additionally, incorporating a compliant, high-temperature ceramic fiber rope or ribbon where the seal 212 is in contact with stair-stepped surfaces may provide increased sealing. Relative to a prior art dog-bone seal, pressure is not trying to lift off (i.e., defeat) one of the contact surfaces of the seal 212, and the seal sections 214, 217 may be formed from a lower-strength material, which enables higher-temperature and more-lubricious materials to be used. Additionally, the seal 212 may fit within a seal cavity having less axial space.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A seal for sealing a seal cavity defined by first and second adjacent components disposed about an axial centerline, the seal comprising:
    a first seal section comprising a first split hoop; and
    a second seal section comprising a second split hoop and a spring element; a third seal section; wherein the spring element contacts the first seal section and is configured to axially load the first seal section against one of the first and second components; wherein the second split hoop contacts the third seal section and is configured to axially load the third seal section against another one of the first and second components; and wherein at least two of the first, second and third seal sections are configured to move relative to one another.

2. The seal of claim 1, wherein the first seal section is configured to sealingly engage with the first and second components.

3. The seal of claim 1, wherein the third seal section comprises a split hoop.

4. The seal of claim 1, wherein the first seal section comprises a first seal section free-state inner diameter that is smaller than a seal cavity inner diameter, such that a radial preload is achieved between the first seal section and at least one of the first and second components.

5. The seal of claim 1, wherein the spring element comprises a plurality of first spring tabs frustoconically but primarily radially extending from said second split hoop.

6. The seal of claim 5, wherein the hoop and the plurality of first spring tabs are integrally formed.

7. The seal of claim 1, further comprising one of a W-seal or M-seal disposed within the seal cavity radially outboard from the first, second, and third seal sections.

8. The seal of claim 1, wherein the seal is formed from one of a high-temperature metal alloy, a high-temperature metal alloy, a high-temperature ceramic material, and a high-temperature ceramic composite, or a combination of two or more of a high-temperature metal alloy, a high-temperature metal alloy, a high-temperature ceramic material, and a high-temperature ceramic composite.

9. The seal of claim 1, further comprising a slot formed in the third seal section, wherein a portion of the second seal section is disposed within the slot.

10. The seal of claim 1, wherein the second split hoop and the spring element are discrete pieces joined at their radially outboard ends.

11. The seal of claim 1, further comprising a wear-resistant ring coupled to a surface of the third seal section, wherein the third seal section is separated from direct contact with the first and second adjacent components.

12. The seal of claim 1, further comprising a slot formed in the first seal section, wherein at least a portion of the second seal section is disposed within the slot.

13. The seal of claim 1, wherein the second seal section is joined to one of the first seal section and the third seal section.

14. The seal of claim 13, wherein the second seal section is joined to one of the first seal section and the third seal section by a weld disposed at one circumferential location.

15. The seal of claim 1, wherein the first seal section includes a groove and the third seal section includes a tongue disposed within the groove.

16. The seal of claim 1, wherein the third seal section is L-shaped in cross-section.

17. A seal for sealing a seal cavity defined by first and second adjacent components disposed about an axial centerline, the seal comprising:
   a first seal section comprising a first split hoop; and a second seal section comprising a scissors-type spring element comprising a plurality of first spring tabs and a plurality of second spring tabs; a third seal section; wherein the plurality of first spring tabs contact the first seal section and the plurality of second spring tabs contact the third seal section; wherein at least two of the first, second and third seal sections are configured to move relative to one another.

18. The seal of claim 17, wherein the first plurality of spring tabs and the second plurality of spring tabs defined a cavity therebetween, the seal further comprising a compliant seal disposed within the cavity.

* * * * *